United States Patent
Glimcher

(10) Patent No.: US 12,298,884 B2
(45) Date of Patent: May 13, 2025

(54) COMPUTING DEVICE/DPU LOG COLLECTION SYSTEM

(71) Applicant: Dell Products L.P., Round Rock, TX (US)

(72) Inventor: Boris Glimcher, Brooklyn, NY (US)

(73) Assignee: Dell Products L.P., Round Rock, TX (US)

(*) Notice: Subject to any disclaimer, the term of this patent is extended or adjusted under 35 U.S.C. 154(b) by 118 days.

(21) Appl. No.: 18/316,052

(22) Filed: May 11, 2023

(65) Prior Publication Data

US 2024/0378132 A1    Nov. 14, 2024

(51) Int. Cl.
  G06F 15/16    (2006.01)
  G06F 9/54     (2006.01)
  G06F 11/34    (2006.01)
  G06F 21/62    (2013.01)
  H04L 29/06    (2006.01)

(52) U.S. Cl.
  CPC ...... *G06F 11/3476* (2013.01); *G06F 21/6245* (2013.01)

(58) Field of Classification Search
  CPC .......................... G06F 11/3476; G06F 21/6245
  USPC ................................................. 709/226, 224
  See application file for complete search history.

(56) References Cited

U.S. PATENT DOCUMENTS

| | | | | |
|---|---|---|---|---|
| 9,378,238 B2* | 6/2016 | Gonsalves | ............... | H04M 3/42 |
| 2012/0005542 A1* | 1/2012 | Petersen | ............ | H04L 63/1425 714/48 |
| 2018/0081779 A1* | 3/2018 | Hiyama | ............... | G06F 11/3664 |
| 2019/0089616 A1* | 3/2019 | Chabbi | ............... | G06F 11/3476 |
| 2020/0125725 A1* | 4/2020 | Petersen | ............... | H04L 43/065 |
| 2020/0334092 A1* | 10/2020 | Ravitzki | ............... | G06F 11/079 |
| 2021/0240162 A1* | 8/2021 | Zoller | ............. | G05B 19/40938 |
| 2022/0100393 A1* | 3/2022 | Quinn | .................. | G06F 3/0661 |
| 2022/0341899 A1* | 10/2022 | Matama | ................ | G01N 30/88 |
| 2023/0010150 A1* | 1/2023 | Ben-Ishay | ............ | H04L 1/0041 |
| 2024/0134970 A1* | 4/2024 | Levy | ..................... | G06F 21/552 |
| 2024/0137384 A1* | 4/2024 | Chawla | ............... | H04L 63/1425 |
| 2024/0185100 A1* | 6/2024 | Ihsani | .................... | G16H 30/40 |
| 2024/0211372 A1* | 6/2024 | Cudak | .................... | G06F 9/542 |
| 2024/0296269 A1* | 9/2024 | Poplack | ............... | G06F 30/331 |
| 2024/0362531 A1* | 10/2024 | MacFarland | .......... | G06N 20/00 |

* cited by examiner

*Primary Examiner* — Hamza N Algibhah
(74) *Attorney, Agent, or Firm* — Joseph Mencher

(57) ABSTRACT

A computing device/DPU log collection system includes a computing device chassis housing a computing device log generation subsystem coupled to a DPU device via physical connection(s). The DPU device emulates a physical storage device to provide an emulated storage device that is presented to the computing device log generation subsystem as a local storage device coupled to the physical connection(s), configures the emulated storage device with a computing device log storage file system, and receives computing device logs from the computing device log generation subsystem via the computing device log storage file system. The DPU device then performs log collection operations that identify a subset of the computing device logs that were received from the computing device log generation subsystem via the computing device log storage file system in the emulated storage device, and transmits the subset of the computing device logs to a log storage system via a network.

20 Claims, 9 Drawing Sheets

COMPUTING DEVICE/DPU LOG COLLECTION SYSTEM

BACKGROUND

The present disclosure relates generally to information handling systems, and more particularly to the collection of logs in information handling systems that include Data Processing Units (DPUs) and/or Smart Network Interface Controllers (SmartNICs).

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices known in the art, sometimes include a Data Processing Unit (DPU) (e.g., in a Smart Network Interface Controller (SmartNIC) included in the server device) that may be used to provide hardware acceleration functionality directed to data processing and data-centric computing operations with relatively higher degrees of parallelism (e.g., relative to Central Processing Units (CPUs) and Graphics Processing Units (GPUs)), while offloading networking and communication workloads from CPUs. However, the provisioning of DPUs in server devices can raise some issues.

For example, conventional server devices and conventional DPUs are each configured to separately manage their respective system logs (e.g., a server system log generated in response to the operation of the server device, and a DPU system log generated in response to operation of the DPU). As such, in order to collect the server system log and the DPU system log in a server device that includes a DPU, separate log collector applications must be installed on each of the server device and the DPU, with the log collector application on the server device operating to collect the server system log and transmit the server system log to a log storage system, and the log collector application on the DPU operating to collect the DPU system log and transmit the DPU system log to the log storage system. As will be appreciated by one of skill in the art in possession of the present disclosure, the installation of separate log collector applications on the server device and its DPU is undesirable to users, as it requires the management and updating of separate software on each of the server device and the DPU that complicates the configuration, operation, and management of the server device/DPU.

Accordingly, it would be desirable to provide a server device/DPU log collection system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide at least one Data Processing Unit (DPU) engine that is configured to: emulate a physical storage device to provide an emulated storage device that is presented to a computing device log generation subsystem as a local storage device that is coupled to at least one computing device log generation subsystem physical connection that is connected to the computing device log generation subsystem; configure the emulated storage device with a computing device log storage file system; receive, from the computing device log generation subsystem via the computing device log storage file system in the emulated storage device, computing device logs; perform log collection operations that include identifying a subset of the computing device logs that were received from the computing device log generation subsystem via the computing device log storage file system in the emulated storage device; and transmit, to a log storage system via a network, the subset of the computing device logs.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
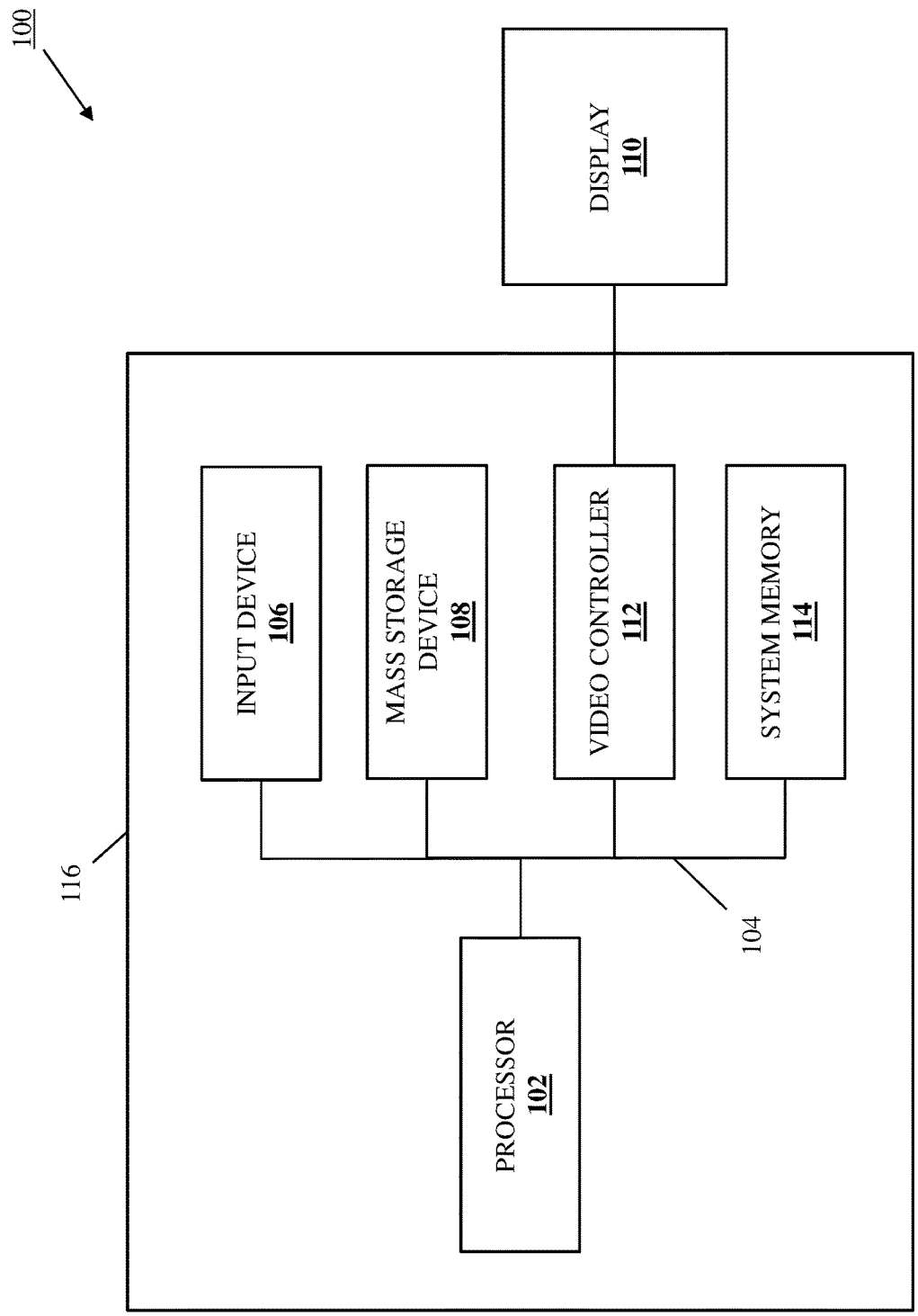
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
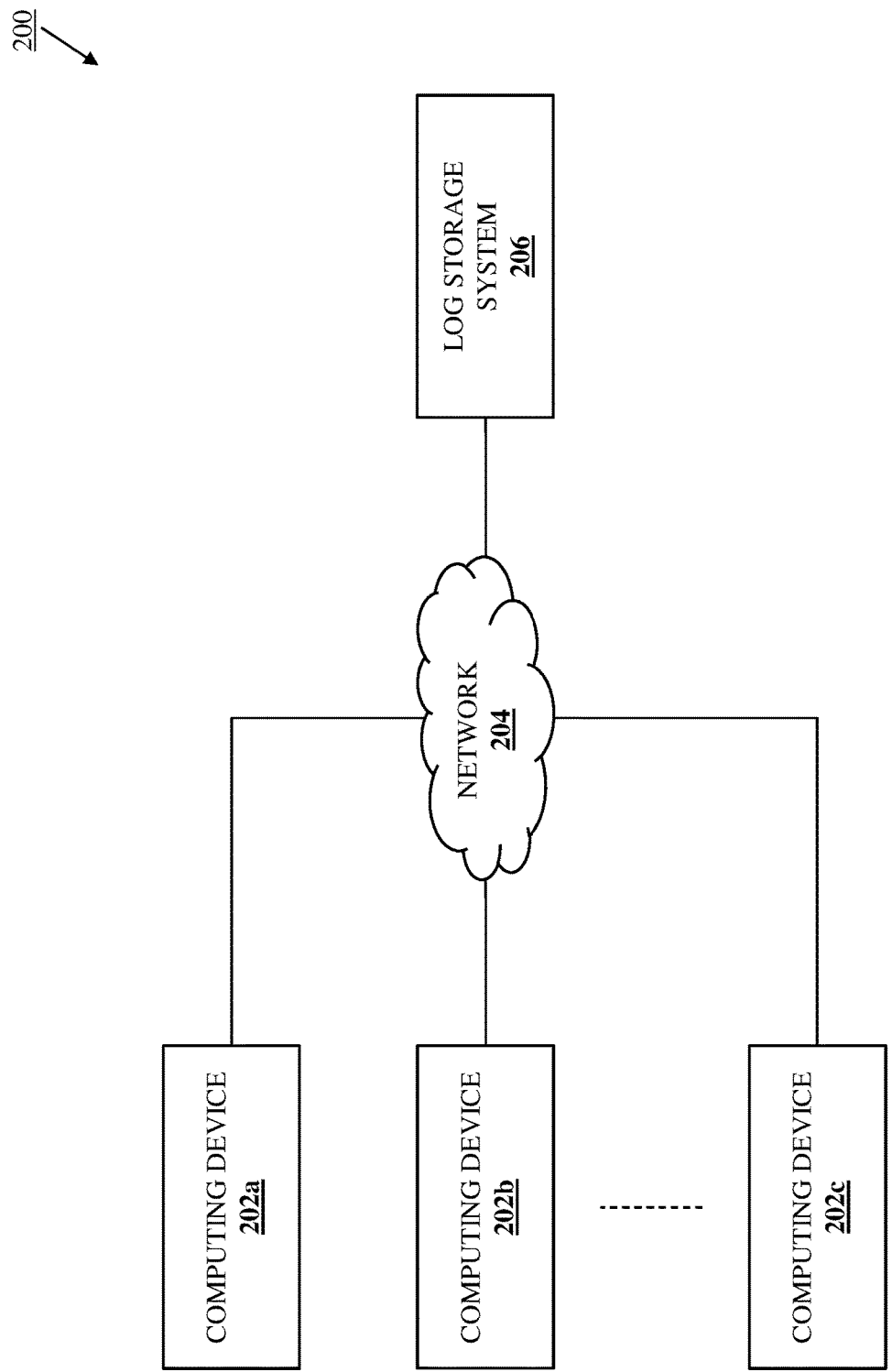
FIG. 2 is a schematic view illustrating an embodiment of a networked system that may include the computing device/DPU log collection system of the present disclosure.

Referring now to FIG. 2, an embodiment of a networked system 200 is illustrated that may include the computing device/DPU log collection system of the present disclosure. In the illustrated embodiment, the networked system 200 includes a plurality of computing devices 202a, 202b, and up to 202c. In an embodiment, the computing device 202a-202c may be provided by the IHS 100 discussed above with reference to FIG. 1, and/or may include some or all of the components of the IHS 100, and in the specific examples discussed below are provided by server devices. However, while illustrated and discussed as being provided by server devices, one of skill in the art in possession of the present disclosure will recognize that computing device provided in the networked system 200 may include any devices (e.g., desktop computing devices, laptop/notebook computing devices, table computing devices, mobile phones, networking devices (e.g., switch devices, router devices, etc.), storage systems, etc.) that may be configured to operate similarly as the computing devices 202a-202c discussed below.

In the illustrated embodiment, each of the computing devices 202a-202c are coupled to a network 204 that may be provided by a Local Area Network (LAN), the Internet, combinations thereof, and/or any other networks that would be apparent to one of skill in the art in possession of the present disclosure. Furthermore, the embodiments illustrated and described herein provide a log storage system 206 that is coupled to the network 204. In an embodiment, the log storage system 206 may be provided by the IHS 100 discussed above with reference to FIG. 1, and/or may include some or all of the components of the IHS 100, and in the specific examples provided below may be provided by one or more server devices. However, while illustrated and discussed as being provided by server devices, one of skill in the art in possession of the present disclosure will recognize that log collection systems provided in the networked system 200 may include any devices that may be configured to operate similarly as the log storage system 206 discussed below. Furthermore, while a specific networked system 200 has been illustrated and described, one of skill in the art in possession of the present disclosure will recognize that networked systems that include the computing device/DPU log collection system of the present disclosure may include a variety of components and component configurations while remaining within the scope of the present disclosure as well.

Figure 3:
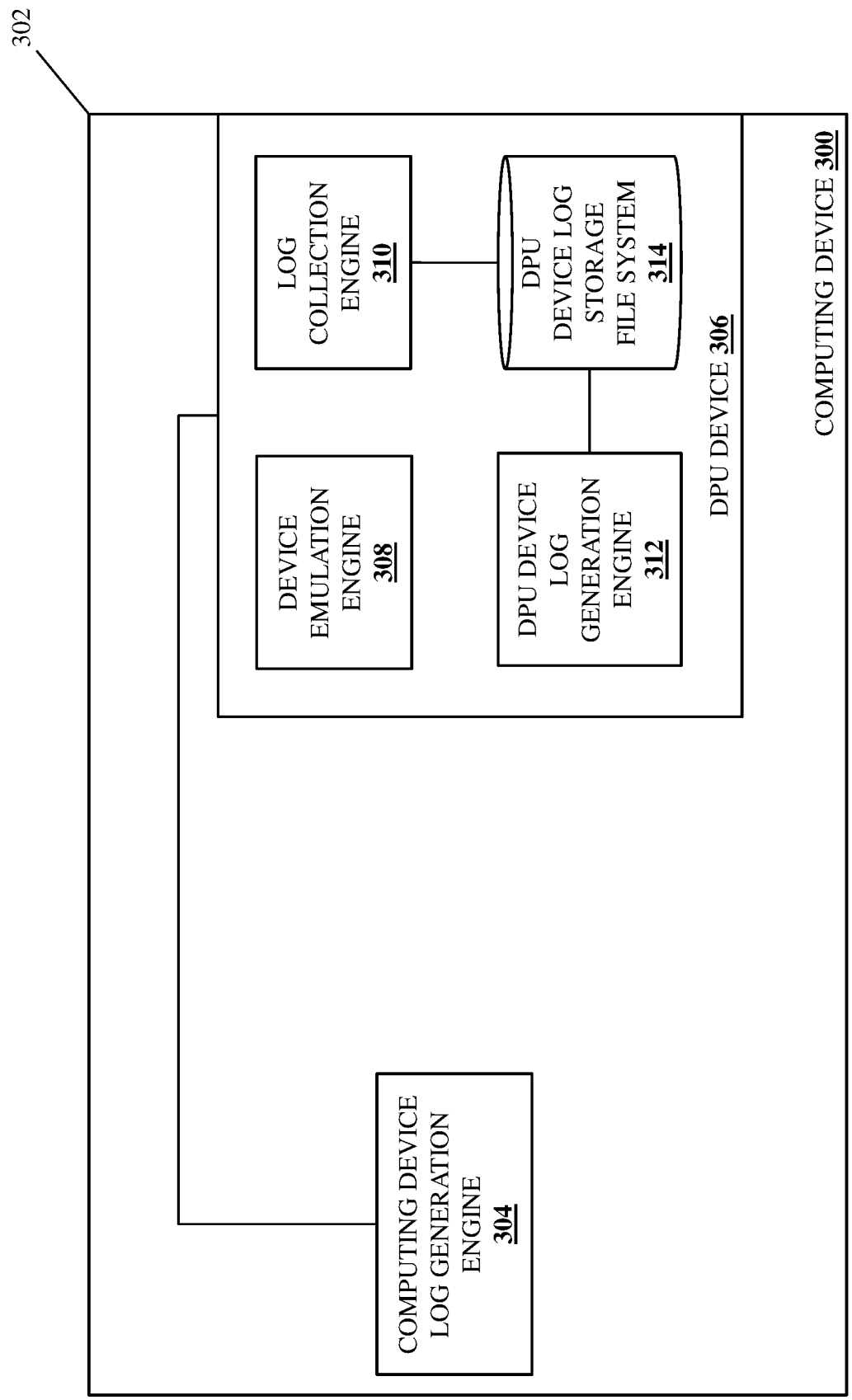
FIG. 3 is a schematic view illustrating an embodiment of a computing device that may provide the computing device/DPU log collection system of the present disclosure.

Referring now to FIG. 3, an embodiment of a computing device 300 is illustrated that may provide any or all of the computing devices 202a-202c discussed above with reference to FIG. 2. As such, the computing device 300 may be provided by the IHS 100 discussed above with reference to FIG. 1 and/or may include some or all of the components of the IHS 100, and in specific examples may be provided by a server device. Furthermore, while illustrated and discussed as being provided by a server device, one of skill in the art in possession of the present disclosure will recognize that the functionality of the computing device 300 discussed below may be provided by other devices (e.g., desktop computing devices, laptop/notebook computing devices, table computing devices, mobile phones, networking devices (e.g., switch devices, router devices, etc.), storage systems, etc.) that are configured to operate similarly as the computing device 300 discussed below.

In the illustrated embodiment, the computing device 300 includes a chassis 302 that houses the components of the computing device 300, only some of which are illustrated and described below. For example, the chassis 302 may house a primary processing system (not illustrated, but which may include the processor 102 discussed above with reference to FIG. 1 such as, for example, a Central Processing Unit (CPU) in a server device) and a primary memory system (not illustrated, but which may include the memory 114 discussed above with reference to FIG. 1 such as for example, Dynamic Random Access Memory (DRAM) devices in a server device) that is coupled to the primary processing system and that includes instructions that, when executed by the primary processing system, cause the primary processing system to provide a computing device log generation engine 304 that is configured to perform the functionality of the computing device log generation engines and/or computing devices discussed below. In a specific example, the computing device log generation engine 304 may provide an operating system that is configured to generate the computing device logs described below, although one of skill in the art in possession of the present disclosure will appreciate how other programs, applications, and/or computing device components may generate similar computing device logs while remaining within the scope of the present disclosure as well.

The chassis 302 may also house a Data Processing Unit (DPU) device 306 that is coupled to the computing device log generation engine via one or more computing device log generation engine physical connections 307 (e.g., circuit board traces, cabling, and/or other couplings between the DPU device 306 and the primary processing system). In a specific example, the computing device log generation engine physical connection(s) 307 may include Peripheral Component Interconnect express (PCIe) connections, although other physical connections will fall within the scope of the present disclosure as well. As will be appreciated by one of skill in the art in possession of the present disclosure, while the DPU device 306 is illustrated and described below as being provided by itself in the computing device 300, the DPU device 306 may be provided in other systems included in the computing device 300 while remaining within the scope of the present disclosure as well.

For example, the DPU device 306 may be included in a networking system in the computing device 300 that may be provided by a Network Interface Controller (NIC) and/or other networking components that would be apparent to one of skill in the art in possession of the present disclosure. In a specific example, the networking system in the computing device 300 that includes the DPU device 206 may be provided by a SmartNIC device (sometimes referred to as a System Control Processor (SCP) device, an Infrastructure Processing Unit (IPU), etc.), which one of skill in the art in possession of the present disclosure will recognize may include a programmable accelerator device that is configured to offload a variety of processing operations from processing systems in the computing device 300 in order to make datacenter networking, security, storage, and/or other computing functionality more efficient and flexible. As such, the DPU device 306 of the present disclosure may be implemented in a variety of manners that will fall within the scope of the present disclosure.

As will be appreciated by one of skill in the art in possession of the present disclosure, the DPU device 306 may include a CPU, a NIC, and one or more programmable data acceleration engines that allow the DPU device 306 to include the generality and programmability of CPUs, while being specialized to operate efficiently on networking data packets, storage requests, analytics requests, and/or other data processing requests that would be apparent to one of skill in the art in possession of the present disclosure. Furthermore, while specific examples described above include a SmartNIC device having the DPU device 306, one of skill in the art in possession of the present disclosure will appreciate that a SmartNIC processing system in the SmartNIC device may replace the DPU device 306 to provide the functionality of the computing device/DPU log collection system described below (e.g., without the need to provide the DPU device 306) while remaining within the scope of the present disclosure as well.

In the illustrated embodiment, the DPU device 306 may include a device emulation processor (not illustrated, but which may be included in SmartNIC firmware, DPU firmware, etc.) and a device emulation memory (not illustrated, but which may be included in SmartNIC firmware, DPU firmware, etc.) that is coupled to the device emulation processor and that includes instructions that, when executed by the device emulation processor, cause the device emulation processor to provide a device emulation engine 308 that is configured to perform the functionality of the device emulation engines, DPU devices, SmartNIC devices, and/or computing devices discussed below. The DPU device 306 may also include a log collection processor (not illustrated, but which may be included in SmartNIC firmware, DPU firmware, etc.) and a log collection memory (not illustrated, but which may be included in SmartNIC firmware, DPU firmware, etc.) that is coupled to the log collection processor and that includes instructions that, when executed by the log collection processor, cause the log collection processor to provide a log collection engine 310 that is configured to provide a log collection application (e.g., similar to the TELEGRAF® log collection application available from INFLUXDATA® of San Francisco, California United States; the open-source FLUENTD® log collection application; the OPENTELEMETRY® log collection application available from the Cloud Native Computing Foundation, etc.) that has been configured/reconfigured to perform the functionality of the log collection engines, log collection applications, DPU devices, SmartNIC devices, and/or computing devices discussed below.

The DPU device 306 may also include a DPU device log generation processor (not illustrated, but which may be included in SmartNIC firmware, DPU firmware, etc.) and a DPU device log generation memory (not illustrated, but which may be included in SmartNIC firmware, DPU firmware, etc.) that is coupled to the DPU device log generation processor and that includes instructions that, when executed by the DPU device log generation processor, cause the DPU device log generation processor to provide a DPU device log generation engine 312 that is configured to perform the functionality of the DPU device log generation engines, DPU devices, SmartNIC devices, and/or computing devices discussed below. The DPU device 306 may also include a storage device (not illustrated, but that may be similar to the storage 108 discussed above with reference to FIG. 1) that is coupled to the log collection engine 310 (e.g., via a coupling between the storage device and the log collection processor) and the DPU device log generation engine 312 (e.g., via a coupling between the storage device and the DPU device log generation processor) and that includes a DPU device log storage file system 314 that is configured to store the DPU device logs described below. However, while a specific computing device 300 has been illustrated and described, one of skill in the art in possession of the present disclosure will recognize that computing devices (or other devices operating according to the teachings of the present disclosure in a manner similar to that described below for the computing device 300) may include a variety of components and/or component configurations for providing conventional computing device functionality, as well as the computing device/DPU log collection functionality discussed below, while remaining within the scope of the present disclosure as well.

Figure 4:
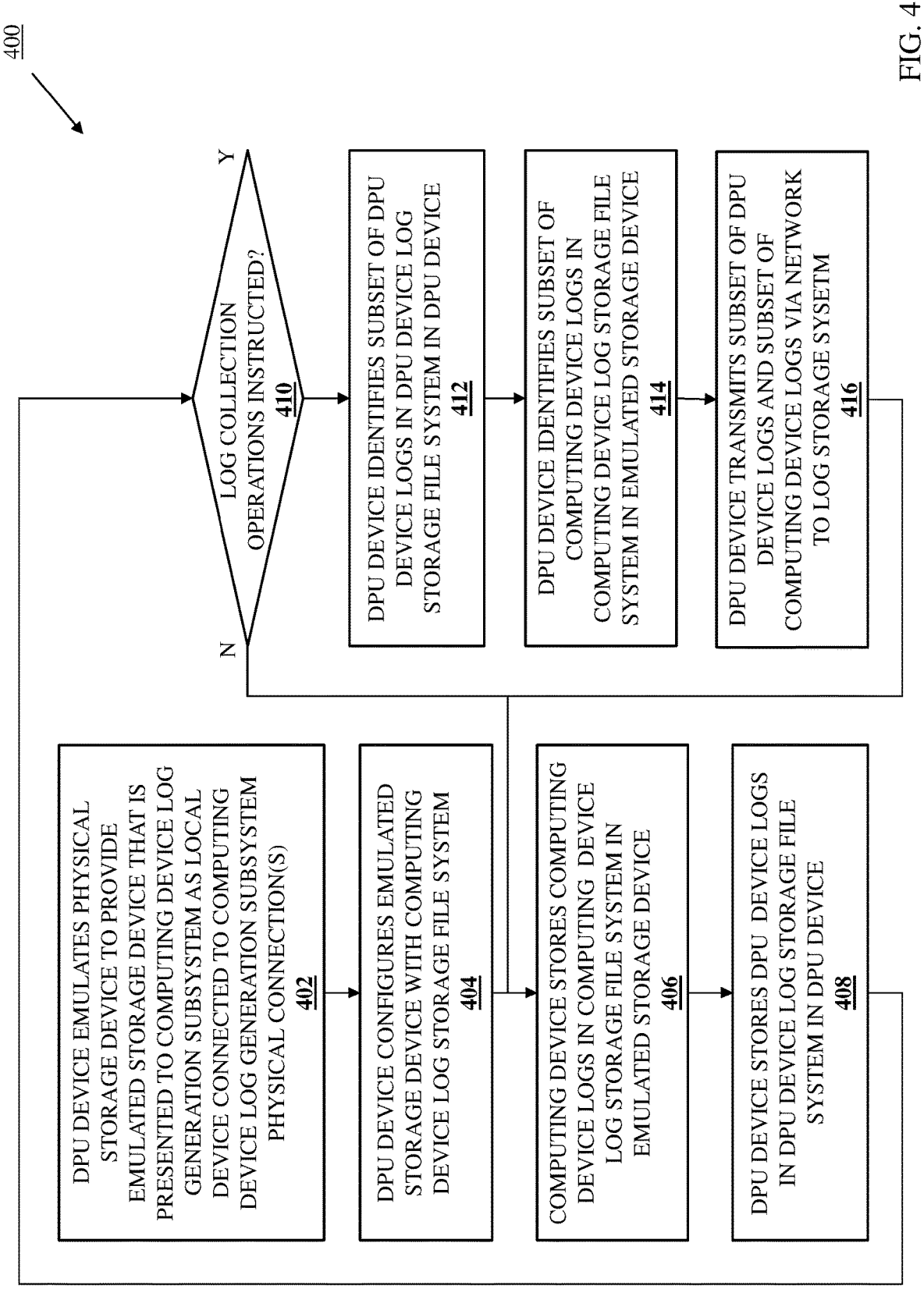
FIG. 4 is a flow chart illustrating an embodiment of a method for collecting logs from a computing device including a DPU device.

Referring now to FIG. 4, an embodiment of a method 400 for collecting logs from a computing device including a Data Processing Unit (DPU) device is illustrated. As discussed below, the systems and methods of the present disclosure include a DPU device that emulates a storage device to provide an emulated storage device to a computing device log generation engine in a computing device that includes the DPU device so that the computing device log generation engine may store computing device logs in a computing device log file storage system in the emulated storage device. For example, the computing device/DPU log collection system of the present disclosure may include a computing device chassis housing a computing device log generation subsystem coupled to a DPU device via physical connection(s). The DPU device emulates a physical storage device to provide an emulated storage device that is presented to the computing device log generation subsystem as a local storage device coupled to the physical connection(s), configures the emulated storage device with a computing device log storage file system, and receives computing device logs from the computing device log generation subsystem via the computing device log storage file system. The DPU device then performs log collection operations that identify a subset of the computing device logs that were received from the computing device log generation subsystem via the computing device log storage file system in the emulated storage device, and transmits the subset of the computing device logs to a log storage system via a network. As such, log collection applications and operations may be eliminated from the computing device and confined to the DPU device.

Figure 5:
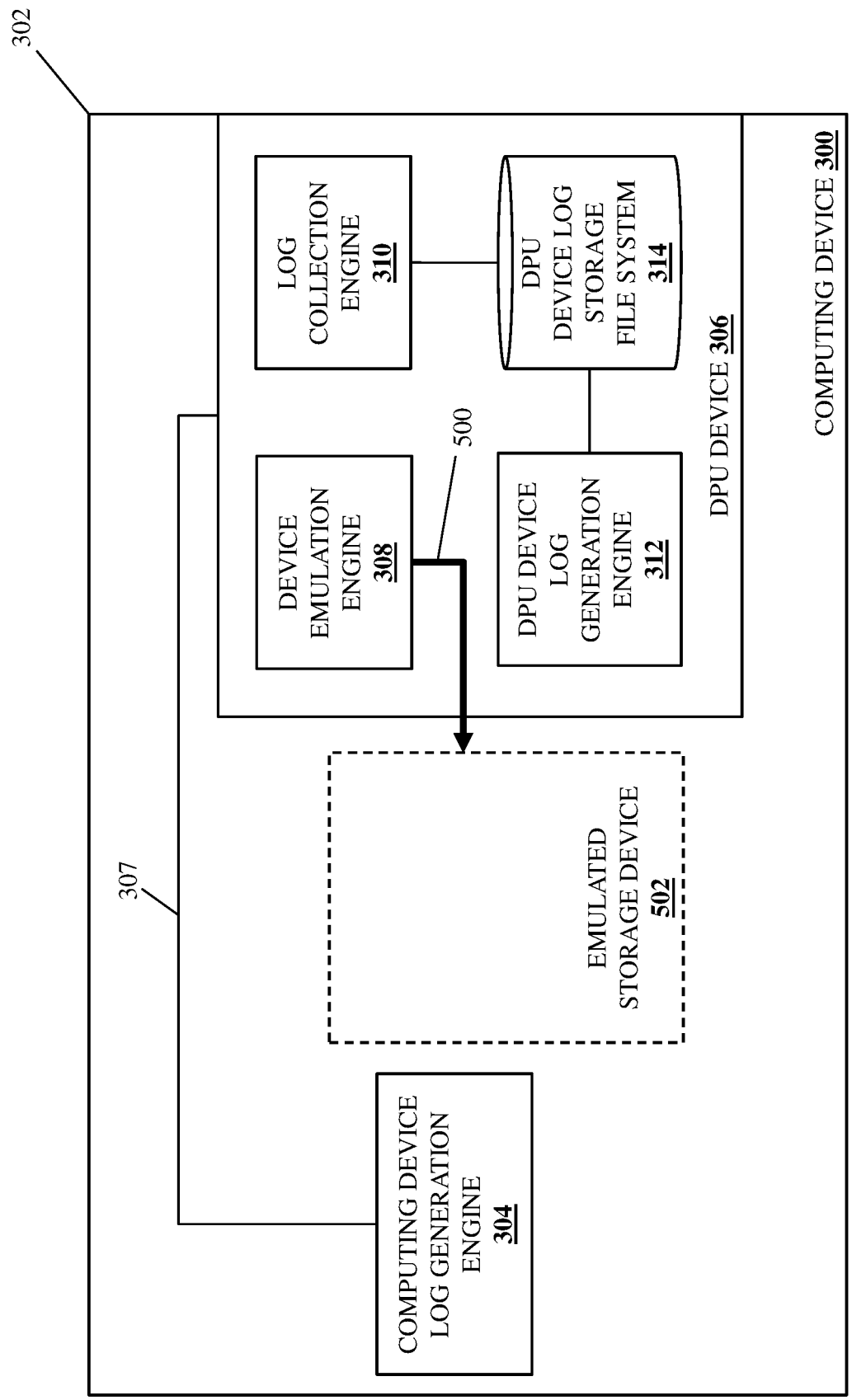
FIG. 5 is a schematic view illustrating an embodiment of the computing device of FIG. 3 operating during the method of FIG. 4.

The method 400 begins at block 402 where a DPU device emulates a physical storage device to provide an emulated storage device that is presented to a computing device log generation subsystem as a local device that is connected to computing device log generation subsystem physical connections. With reference to FIG. 5, in an embodiment of block 502, the device emulation engine 308 in the DPU device 306 may perform storage device emulation operations 500 in order to provide an emulated storage device 502. As will be appreciated by one of skill in the art in possession of the present disclosure, one or more physical storage devices that are accessible to the device emulation engine 308 may be used by the device emulation engine 308 in order to perform the storage device emulation operations 500 and provide the emulated storage device 502 at block 402. To provide a specific example, the storage device emulation operations 500 may include Non-Volatile Memory express (NVMe) emulation operations used to emulate NVMe storage devices, although other device emulation techniques are envisioned as falling within the scope of the present disclosure as well.

In some embodiments, a network-connected storage device (e.g., a NVMe over Fabrics (NVMe-oF) storage device) that is coupled to the network 204 may be used to provide the emulated storage device 502. In other embodiments, an NVMe storage device included in the DPU device 306 may be used to provide the emulated storage device 502. In yet other embodiments, an NVMe storage device that is included in the chassis 302 of the computing device 300 with the DPU device 306 and coupled to the DPU device 306 may be used to provide the emulated storage device 502. However, while a few specific examples of different NVMe storage device configurations have been provided, one of skill in the art in possession of the present disclosure will appreciate how any of a variety of storage devices may be made accessible to the device emulation engine 308 for use in providing the emulated storage device 502 while remaining within the scope of the present disclosure as well.

To provide a specific example, the storage device emulation operations 500 performed by the device emulation engine 308 may include communicating with the physical storage device (e.g., through the network 204, directly, etc.) and, based at least partly on those communications, presenting that physical storage device as a "local" storage device to the computing device log generation engine 304 in the computing device 300. As will be appreciated by one of skill in the art in possession of the present disclosure, the storage device emulation operations 500 performed by the device emulation engine 308 may include presenting the emulated storage device 502 to an operating system, applications, and/or other programs provided by the computing device log generation engine 304 in the computing device 300 via the computing device log generation engine physical connection(s) 307 such that the emulated storage device 502 appears to the operating system, applications, and/or other programs as a "local" storage device that is connected to the computing device log generation engine physical connection(s) 307. As such, one of skill in the art in possession of the present disclosure will appreciate how the operating system, applications, and/or other programs provided by the computing device log generation engine 304 may view the emulated storage device 502 as a physical storage device that is located in the chassis 302 of the computing device 300 and connected to the computing device log generation engine 304 (e.g., connected to the primary processing system that provides the computing device log generation engine 304) via the computing device log generation engine physical connection(s) 307 (i.e., a "local" storage device).

Figure 6:
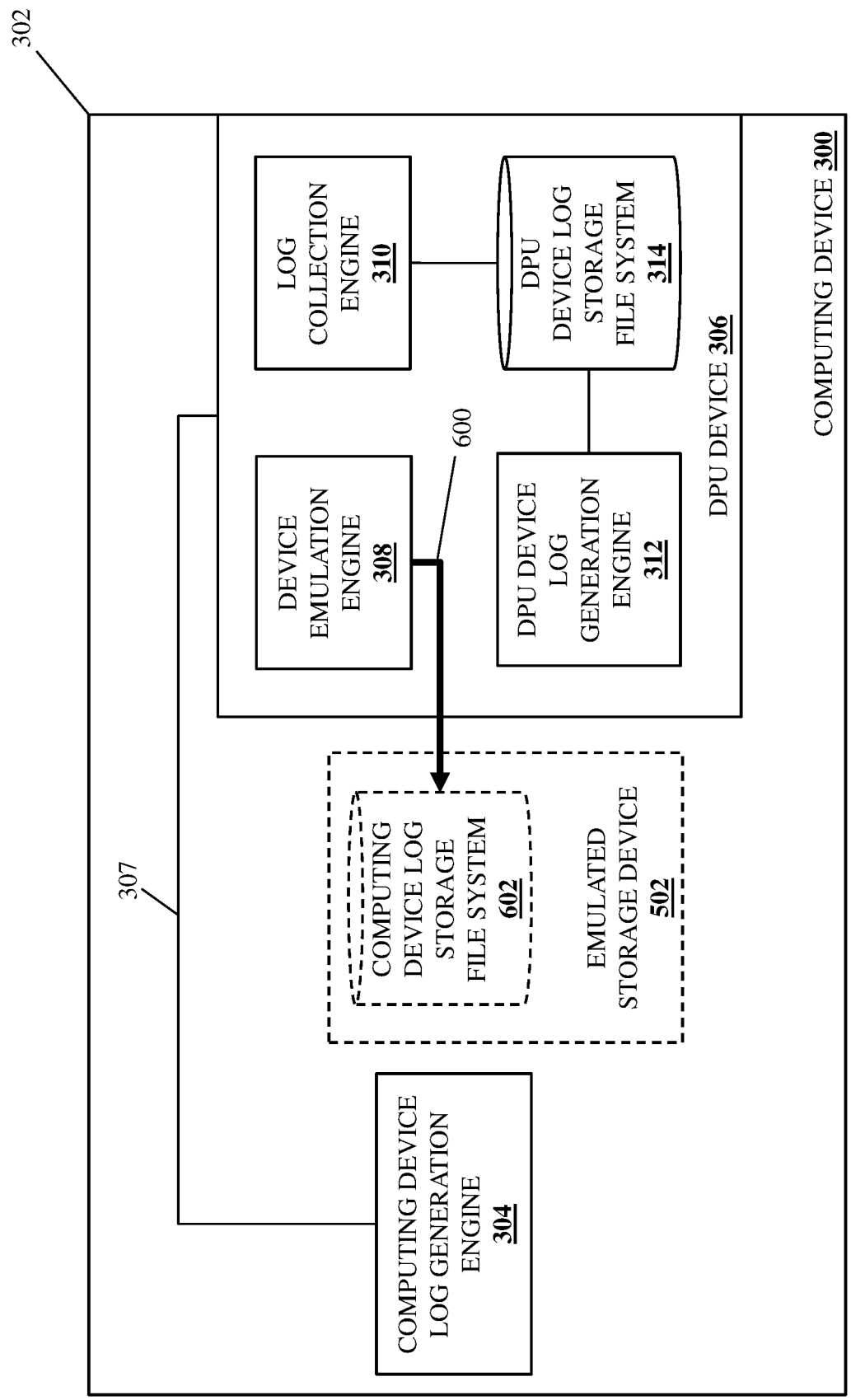
FIG. 6 is a schematic view illustrating an embodiment of the computing device of FIG. 3 operating during the method of FIG. 4.

The method 400 then proceeds to block 404 where the DPU device configures the emulated storage device with a computing device log storage file system. With reference to FIG. 6, in an embodiment of block 404, the device emulation engine in the DPU device 306 may perform computing device log storage file system configuration operations 600 that include configuring the emulated storage device 502 with a computing device log storage file system 602 that is configured for the storage of computing device logs by the computing device log generation engine 304. For example, the computing device log storage file system configuration operations 600 may include formatting the physical storage device that is being used to provide the emulated storage device 602 (e.g., formatting a namespace of that physical storage device) with a computing device log storage file system that is exposed to the computing device log generation engine 304, "tagging" or otherwise identifying that computing device log storage file system in a manner that identifies it as a log storage location for the computing device log generation engine 304, and/or performing any other computing device log storage file system configuration operations that one of skill in the art in possession of the present disclosure would recognize as resulting in the computing device log storage functionality described below.

One of skill in the art in possession of the present disclosure will appreciate how the presentment of that physical storage device as a "local" storage device to the computing device log generation engine 304, the identification of the computing device log storage file system as a log storage location for the computing device log generation engine 304, and/or the other operations discussed above allows the computing device log generation engine 304 to "see" that computing device log storage file system as being included on that "local" storage device. However, while a specific example of the configuration of the emulated storage device 502 with a file system that is configured for use by the computing device log generation engine 304 in storing computing device logs has been described, one of skill in the art in possession of the present disclosure will appreciate how the emulated storage device 502 may be configured to store computing device logs generated by the computing device log generation engine 304 in a variety of manners that will fall within the scope of the present disclosure as well.

Figure 7:
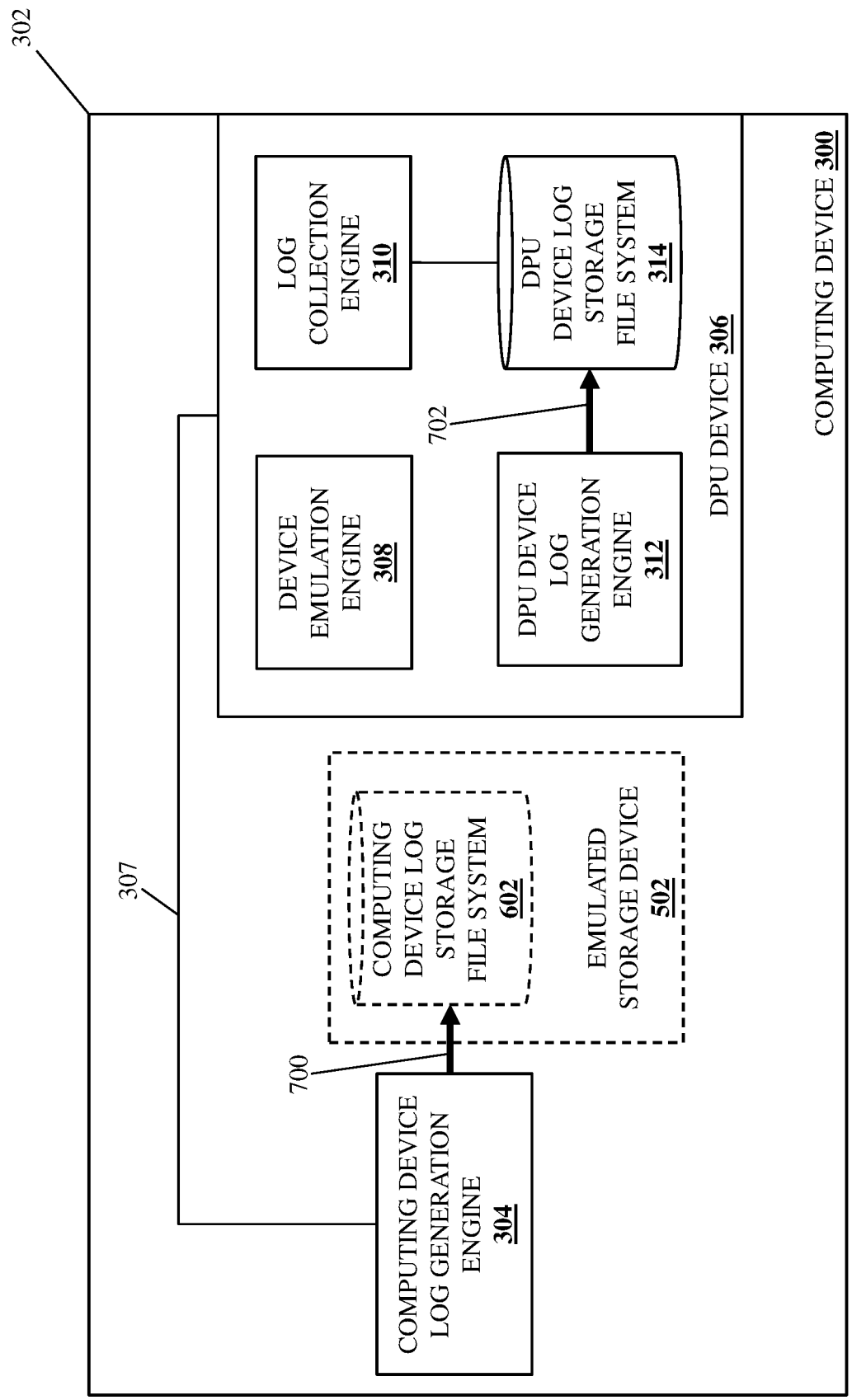
FIG. 7 is a schematic view illustrating an embodiment of the computing device of FIG. 3 operating during the method of FIG. 4.
Figure 8:
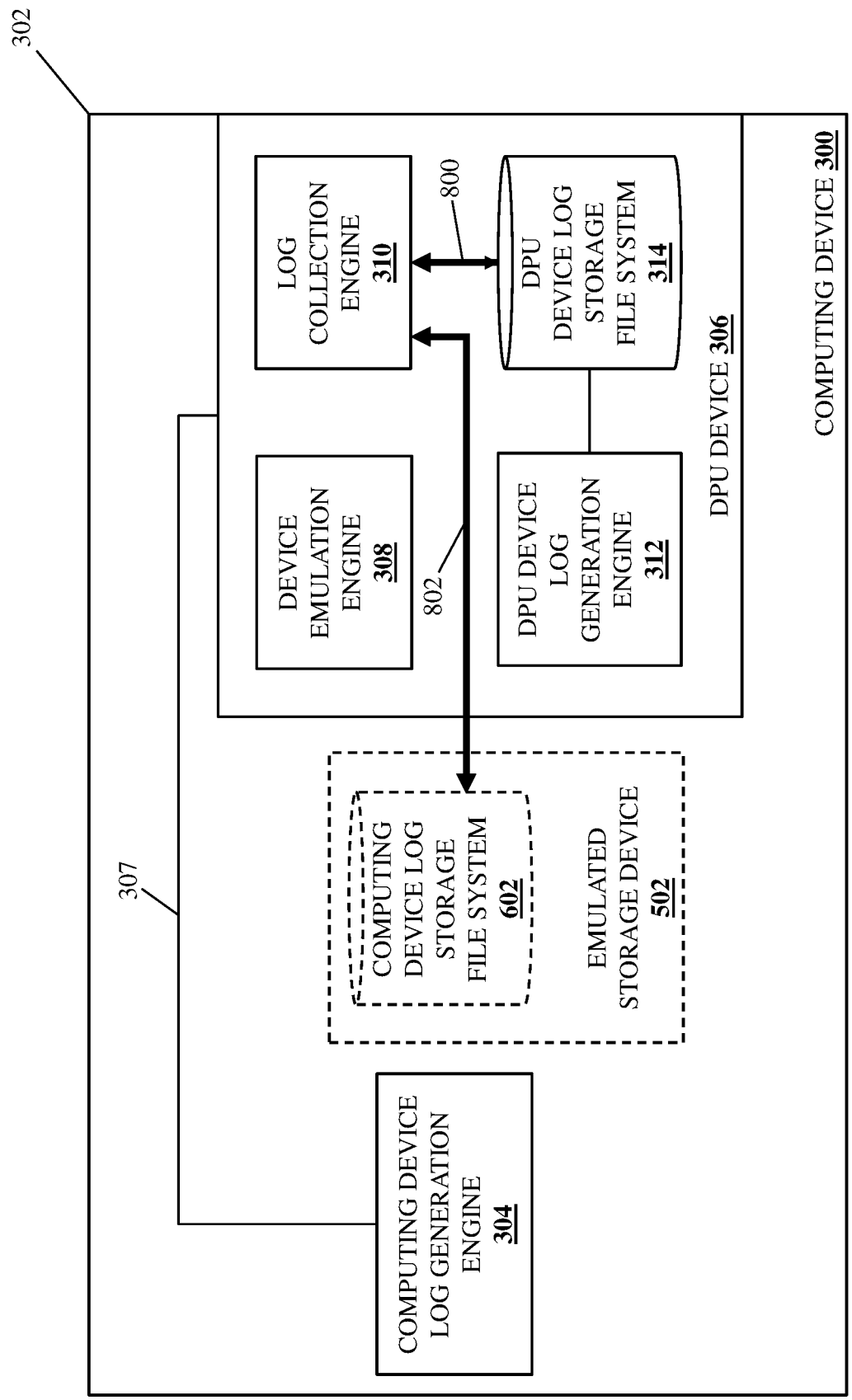
FIG. 8 is a schematic view illustrating an embodiment of the computing device of FIG. 3 operating during the method of FIG. 4.

The method 400 then proceeds to block 406 where a computing device stores computing device logs in the computing device log storage file system in the emulated storage device. With reference to FIG. 7, in an embodiment of block 406 and following the configuration of the emulated storage device 502 with the computing device log storage file system 602 at block 404, the computing device log generation engine 304 may perform computing device log storage operations 700 that may include generating computing device logs and storing those computing device logs in the computing device log storage file system 602 configured in the emulated storage device 502. For example, in embodiments in which the computing device log generation engine 304 provides an operating system for the computing device 300, the computing device log storage operations 700 may include generating system logs (syslogs), telemetry data, and/or other log information for the computing device 300 and storing it in the computing device log storage file system 602 configured in the emulated storage device 502. However, while a specific computing device log generation engine and specific computing device logs have been described, one of skill in the art in possession of the present disclosure will appreciate how applications, programs, and/or other computing device log generation entities may generate and store other types of computing device logs in the computing device log storage file system 602 configured in the emulated storage device 502 while remaining within the scope of the present disclosure as well.

As will be appreciated by one of skill in the art in possession of the present disclosure, from the perspective of the computing device log generation engine 304, the storage of the computing device logs at block 406 includes the transmission of those computing device logs via the computing device log generation engine physical connection(s) 307 (e.g., PCIe connections) for storage in the computing device log storage file system 602 included in a physical storage device that appears to be directly connected to the computing device log generation engine physical connection(s) 307 (i.e., due to the presentment of the emulated storage device 602 as a local storage device in the computing device 300). However, one of skill in the art in possession of the present disclosure will also recognize that the computing device logs transmitted via the computing device log generation engine physical connection(s) 307 by the computing device log generation engine 304 are actually received by the device emulation engine 308 in the DPU device 306, and then provided for storage (e.g., via the network 204, directly, etc.) in the computing device log storage file system 602 that was configured in the physical storage device that is being used to provide the emulated storage device 502.

The method 400 then proceeds to block 408 where the DPU device stores DPU device logs in a DPU device log storage file system in the DPU storage device. With continued reference to FIG. 7, in an embodiment of block 408, the DPU device log generation engine 312 may perform DPU device log storage operations 702 that may include generating DPU device logs and storing those DPU device logs in the DPU device log storage file system 602 included in the DPU device 306. As will be appreciated by one of skill in the art in possession of the present disclosure, the operation of the DPU device 306 and/or any of its components may be accompanied by the generation of DPU device logs by that DPU device log generation engine 312 that identify any of a variety of details about those operations, and any of those DPU device logs may be stored at block 406 while remaining within the scope of the present disclosure as well. For example, the DPU device log storage operations 702 may include generating system logs (syslogs), telemetry data, and/or other log information for the DPU device 306 and storing it in the DPU device log storage file system 314 in the DPU device 306.

The method 400 then proceeds to decision block 410 where it is determined whether log collection operations have been instructed. In an embodiment, at decision block 410, the log collection engine 310 may determine whether log collection operations have been instructed. As discussed above, the log collection engine 310 may provide a log collection application that may be configured to perform the log collection operations described in further detail below, and that log collection application may be configured to periodically collect logs, to collect logs in response to receiving an instruction from a management system, and/or to collect logs in a variety of other manners that would be apparent to one of skill in the art in possession of the present disclosure. As such, embodiments of decision block 410 may include the log collection engine 310 monitoring for a periodic log collection instruction that was previously configured to provide for the periodic log collections described above, a manual log collection instruction that may be received via the network 204 from a management system, and/or any other log collection instruction that would be apparent to one of skill in the art in possession of the present disclosure. However, while several specific examples of the determination of whether log collection operations should be performed have been described, one of skill in the art in possession of the present disclosure will appreciate how the log collection operations described below may be performed in a variety of other situations that will fall within the scope of the present disclosure as well.

If, at decision block 406, it is determined that log collection operations have not been instructed, the method 400 returns to block 406. As such, the method 400 may loop such that the computing device log generation engine 304 stores computing device logs in the computing device log storage file system 602 configured in the emulated storage device 502, and the DPU device stores DPU device logs in the DPU device log storage file system 314 in the DPU device 306, as long as log collection operations have not been instructed.

If at decision block 406, it is determined that log collection operations have been instructed, the method 400 proceeds to block 412 where the DPU device identifies a subset of the DPU device logs in the DPU device log storage file system in the DPU device. In an embodiment, at block 412 and in response to determining at decision block 410 that the periodic log collection instruction, the manual log collection instruction, and/or other log collection instructions discussed above have been received, the log collection engine 310 may perform DPU device log identification operations 800 that include identifying a subset of the computing device logs that were previously stored by the DPU device log generation engine 312 in the DPU device log storage file system 314 in the DPU device.

As will be appreciated by one of skill in the art in possession of the present disclosure, the repeated storage of DPU device logs in the DPU device log storage file system 314 in the DPU device 306 may provide a relatively large amount of data in the DPU device log storage file system 314, and thus the subset of the DPU device logs may be identified at block 412 to reduce the amount of data collected as part of the log collection operations. To provide some specific examples, the subset of the DPU device logs identified at block 412 may include only the data provided in the most recent storage of DPU device logs by the DPU device log generation engine 312 (e.g., the most recent iteration of block 408 of the method 400). In another specific example, the subset of the DPU device logs identified at block 412 may include only data in the DPU device logs having data characteristics that were defined in the log collection instruction. However, while specific examples of subsets of DPU device logs that may be identified at block 412 have been described, one of skill in the art in possession of the present disclosure will appreciate how a variety of different subsets of DPU device logs may be collected at block 412 while remaining within the scope of the present disclosure as well.

For example, in some embodiments the identification of the subset of DPU device logs at block 412 may include the log collection engine 310 performing any of a variety of operations on the DPU device logs and/or subsets of DPU device logs. For example, at block 412, the log collection engine 310 may generate metadata that identifies the DPU device 306 (e.g., a service tag or other DPU device identifier), and may provide that metadata along with the subset of the DPU device logs identified at block 412. In another example, at block 412, the log collection engine 310 may sanitize the subset of the DPU device logs identified at block 412 by, for example, removing passwords, Internet Protocol (IP) addresses, and/or any other sensitive information that would be apparent to one of skill in the art in possession of the present disclosure. In another example, at block 412, the log collection engine 310 may compress and/or batch the subset of the DPU device logs identified at block 412. In yet another example, at block 412, the log collection engine 310 may perform antivirus scans on the subset of DPU device logs identified at block 412. As such, while a few specific examples have been provided, one of skill in the art in possession of the present disclosure will appreciate how the subset of DPU logs may be identified, modified, supplemented, and/or otherwise determined in a variety of manners that will fall within the scope of the present disclosure as well.

The method 400 then proceeds to block 414 where the DPU device identifies a subset of the computing device logs in the computing device log storage file system in the emulated storage device. In an embodiment, at block 414 and in response to determining at decision block 410 that the periodic log collection instruction, the manual log collection instruction, and/or other log collection instructions discussed above have been received, the log collection engine 310 may perform computing device log identification operations 802 that include identifying a subset of the computing device logs that were previously stored by the computing device log generation engine 304 in the computing device log storage file system 602 configured for the emulated storage device 502. As will be appreciated by one of skill in the art in possession of the present disclosure, the identification of the subset of the computing device logs from the computing device log storage file system 602 configured for the emulated storage device 502 may include the log collection engine 310 accessing the computing device log storage file system 602 configured in the physical storage device that is being used to provide the emulated storage device 502, and identifying that subset of computing device logs.

In some embodiments, the computing device log identification operations 802 performed by the log collection engine 310 in the DPU device 306 at block 414 may include scanning, inspecting (e.g., performing any of a variety of "deep inspection" operations), and/or otherwise reviewing the data stored in the computing device log storage file system 602 configured for the emulated storage device 502 (i.e., the computing device log storage file system 602 included in the physical storage device that is being used to provide the emulated storage device 502) in order to identify the subset of the computing device logs. As will be appreciated by one of skill in the art in possession of the present disclosure, the DPU device 306 may not be configured to "see" the computing device log storage file system 602 configured for the emulated storage device 502 (i.e., because it is configured for use by the computing device log generation engine 304), so the log collection engine 310 may be provided with location information for the physical storage device/corresponding emulated storage device, offset information for the physical storage device/corresponding emulated storage device, protocol information for the physical storage device/corresponding emulated storage device, encryption information for the physical storage device/corresponding emulated storage device, and/or any other information for the physical storage device/corresponding emulated storage device that one of skill in the art in possession of the present disclosure would recognize as allowing the log collection engine 310 to scan, inspect, and/or otherwise review the data stored in the computing device log storage file system 602 configured for the emulated storage device 502 and identify the subset of the computing device logs.

As will be appreciated by one of skill in the art in possession of the present disclosure, the repeated storage of computing device logs in the computing device log storage file system 602 configured for the emulated storage device 502 may provide a relatively large amount of data in the emulated storage device 502, and thus a subset of the computing device logs may be identified at block 414 to reduce the amount of data collected as part of the log collection operations. To provide some specific examples, the subset of the computing device logs identified at block 414 may include only the data provided in the most recent storage of computing device logs by the computing device log generation engine 304 (e.g., the most recent iteration of block 406 of the method 400). In another specific example, the subset of the computing device logs identified at block 414 may include only data in the computing device logs having data characteristics that were defined in the log collection instruction. However, while specific examples of subsets of computing device logs that may be identified at block 414 have been described, one of skill in the art in possession of the present disclosure will appreciate how a variety of different subsets of computing device logs may be identified at block 414 while remaining within the scope of the present disclosure as well.

Similarly to the DPU device logs described above, in some embodiments the identification of the subset of computing device logs at block 414 may include the log collection engine 310 performing any of a variety of operations on the computing device logs and/or subsets of computing device logs. For example, at block 414, the log collection engine 310 may generate metadata that identifies the computing device 300 (e.g., a service tag or other computing device identifier), and may provide that metadata along with the subset of the computing device logs identified at block 414. In another example, at block 414, the log collection engine 310 may sanitize the subset of the computing device logs identified at block 414 by, for example, removing passwords, Internet Protocol (IP) addresses, and/or any other sensitive information that would be apparent to one of skill in the art in possession of the present disclosure and that may have been identified during the inspection (i.e., the "deep inspection" operations) of the data included in the computing device log storage file system 602 configured for the emulated storage device 502. In another example, at block 414, the log collection engine 310 may compress and/or batch the subset of the computing device logs identified at block 414. In yet another example, at block 414, the log collection engine 310 may perform antivirus scans on the subset of computing device logs identified at block 414. As such, while a few specific examples have been provided, one of skill in the art in possession of the present disclosure will appreciate how the subset of computing logs may be identified, modified, supplemented, and/or otherwise determined in a variety of manners that will fall within the scope of the present disclosure as well.

Figure 9:
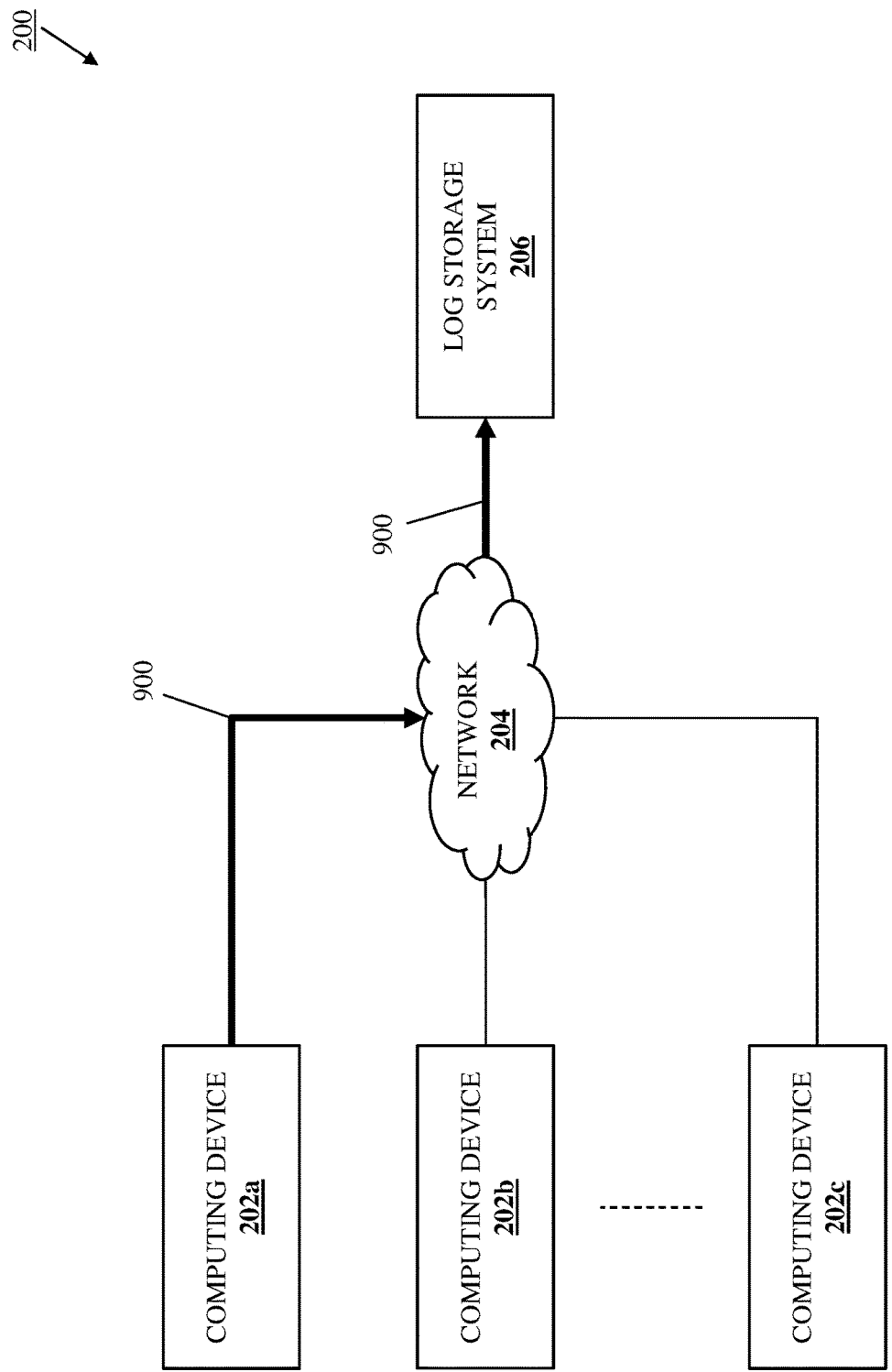
FIG. 9 is a schematic view illustrating an embodiment of the networked system of FIG. 2 operating during the method of FIG. 4.

The method 400 then proceeds to block 416 where the DPU device transmits the subset of the DPU device logs and the subset of the computing device logs via a network to a log storage system. With reference to FIG. 9, in an embodiment of block 416, the log collection engine 310 in the DPU device 306 of the computing device 202a/300 may perform log transmission operations 900 that include transmitting the subset of DPU device logs identified at block 412 and the subset of computing device logs identified at block 414 via the network 204 and to the log storage system 206 for storage. As will be appreciated by one of skill in the art in possession of the present disclosure, in some embodiments the subset of DPU device logs and the subset of computing devices logs may be combined for storage in the log storage system 206 (e.g., by the log collection engine 310 prior to their transmission to the log storage system 206, by the log storage system 206 upon their receipt, etc.), while in other embodiments the subset of DPU device logs and the subset of computing devices logs may be stored separately in the log storage system 206 (e.g., transmitted separately to the log storage system 206 by the log collection engine 310). The method 400 then returns to block 406. As such, the method 400 may loop such that subsets of computing device logs stored in an emulated storage device provided by the DPU device 306, as well as DPU device logs stored in a storage device in the DPU device, are collected and provided for storage in the log storage system 306 by the DPU device 306 when log collection operations are instructed.

Thus, systems and methods have been described that include a DPU device that emulates a storage device to provide an emulated storage device to a computing device log generation engine in a computing device that includes the DPU device so that the computing device log generation engine may store computing device logs in a computing device log file storage system in the emulated storage device. For example, the computing device/DPU log collection system of the present disclosure may include a computing device chassis housing a computing device log generation subsystem coupled to a DPU device via physical connection(s). The DPU device emulates a physical storage device to provide an emulated storage device that is presented to the computing device log generation subsystem as a local storage device coupled to the physical connection(s), configures the emulated storage device with a computing device log storage file system, and receives computing device logs from the computing device log generation subsystem via the computing device log storage file system. The DPU device then performs log collection operations that identify a subset of the computing device logs that were received from the computing device log generation subsystem via the computing device log storage file system in the emulated storage device, and transmits the subset of the computing device logs to a log storage system via a network. As such, log collection applications and operations may be eliminated from the computing device and confined to the DPU device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computing device/Data Processing Unit (DPU) log collection system, comprising:
   a computing device chassis;
   a computing device log generation subsystem that is included in the computing device chassis; and
   a Data Processing Unit (DPU) device that is included in the computing device chassis, that is coupled to the computing device log generation subsystem via at least one computing device log generation subsystem physical connection, and that is configured to:
   emulate a physical storage device to provide an emulated storage device that is presented to the computing device log generation subsystem as a local storage device that is coupled to the at least one computing device log generation subsystem physical connection;
   configure the emulated storage device with a computing device log storage file system;
   receive, from the computing device log generation subsystem via the computing device log storage file system in the emulated storage device, computing device logs;
   perform log collection operations that include identifying a subset of the computing device logs that were received from the computing device log generation subsystem via the computing device log storage file system in the emulated storage device; and
   transmit, to a log storage system via a network, the subset of the computing device logs.

2. The system of claim 1, wherein the computing device log generation subsystem is provided by an operating system, and wherein the computing device logs include system logs (syslogs).

3. The system of claim 1, wherein the DPU device is configured to:
   generate DPU device logs;
   store the DPU device logs in a DPU device log storage file system;
   perform the log collection operations that include identifying a subset of the DPU device logs that were stored in the DPU device log storage file system; and
   transmit, to the log storage system via the network, the subset of the DPU device logs.

4. The system of claim 3, wherein the DPU device is configured to:
   combine the subset of the DPU device logs with the subset of the computing device logs prior to transmitting the subset of the DPU device logs and the subset of the computing device logs to the log storage system via the network.

5. The system of claim 1, wherein the DPU device is configured to:
   scan the emulated storage device to identify the subset of the computing device logs.

6. The system of claim 1, wherein the DPU device is configured to:
   sanitize the subset of the computing device logs prior to transmitting the subset of the computing device logs to the log storage system via the network.

7. An Information Handling System (IHS), comprising:
   a processing system including at least one hardware processor; and
   a memory system that is coupled to the processing system and that includes instructions that, when executed by the processing system, cause the at least one hardware processor included in the processing system to provide at least one Data Processing Unit (DPU) engine that is configured to:
- emulate a physical storage device to provide an emulated storage device that is presented to a computing device log generation subsystem as a local storage device that is coupled to at least one computing device log generation subsystem physical connection that is connected to the computing device log generation subsystem;
- configure the emulated storage device with a computing device log storage file system;
- receive, from the computing device log generation subsystem via the computing device log storage file system in the emulated storage device, computing device logs;
- perform log collection operations that include identifying a subset of the computing device logs that were received from the computing device log generation subsystem via the computing device log storage file system in the emulated storage device; and
- transmit, to a log storage system via a network, the subset of the computing device logs.

8. The IHS of claim 7, wherein the computing device log generation subsystem is provided by an operating system, and wherein the computing device logs include system logs (syslogs).

9. The IHS of claim 7, wherein the at least one DPU engine is configured to:
- generate DPU device logs;
- store the DPU device logs in a DPU device log storage file system;
- perform the log collection operations that include identifying a subset of the DPU device logs that were stored in the DPU device log storage file system; and
- transmit, to the log storage system via the network, the subset of the DPU device logs.

10. The IHS of claim 9, wherein the at least one DPU engine is configured to:
- combine the subset of the DPU device logs with the subset of the computing device logs prior to transmitting the subset of the DPU device logs and the subset of the computing device logs to the log storage system via the network.

11. The IHS of claim 7, wherein the at least one DPU engine is configured to:
- scan the emulated storage device to identify the subset of the computing device logs.

12. The IHS of claim 7, wherein the at least one DPU engine is configured to:
- sanitize the subset of the computing device logs prior to transmitting the subset of the computing device logs to the log storage system via the network.

13. The IHS of claim 7, wherein the at least one DPU engine is configured to:
- generate metadata that identifies a computing device for which the subset of the computing device logs were generated and transmit the metadata along with the subset of the computing device logs to the log storage system via the network.

14. A method for collecting logs from a computing device including a Data Processing Unit (DPU) device, comprising:
- emulating, by a Data Processing Unit (DPU) device included in a computing device, a physical storage device to provide an emulated storage device that is presented to a computing device log generation subsystem in the computing device as a local storage device that is coupled to at least one computing device log generation subsystem physical connection that is connected to the computing device log generation subsystem;
- configuring, by the DPU device, the emulated storage device with a computing device log storage file system;
- receiving, by the DPU device from the computing device log generation subsystem via the computing device log storage file system in the emulated storage device, computing device logs;
- performing, by the DPU device, log collection operations that include identifying a subset of the computing device logs that were received from the computing device log generation subsystem via the computing device log storage file system in the emulated storage device; and
- transmitting, by the DPU device to a log storage system via a network, the subset of the computing device logs.

15. The method of claim 14, wherein the computing device log generation subsystem is provided by an operating system, and wherein the computing device logs include system logs (syslogs).

16. The method of claim 14, further comprising:
- generating, by the DPU device, DPU device logs;
- storing, by the DPU device, the DPU device logs in a DPU device log storage file system;
- performing, by the DPU device, the log collection operations that include identifying a subset of the DPU device logs that were stored in the DPU device log storage file system; and
- transmitting, by the DPU device to the log storage system via the network, the subset of the DPU device logs.

17. The method of claim 14, further comprising:
- combining, by the DPU device, the subset of the DPU device logs with the subset of the computing device logs prior to transmitting the subset of the DPU device logs and the subset of the computing device logs to the log storage system via the network.

18. The method of claim 14, further comprising:
- scanning, by the DPU device, the emulated storage device to identify the subset of the computing device logs.

19. The method of claim 14, further comprising:
- sanitizing, by the DPU device, the subset of the computing device logs prior to transmitting the subset of the computing device logs to the log storage system via the network.

20. The method of claim 14, further comprising:
- generating, by the DPU device, metadata that identifies a computing device for which the subset of the computing device logs were generated and transmit the metadata along with the subset of the computing device logs to the log storage system via the network.

* * * * *